United States Patent
Morille et al.

(10) Patent No.: US 11,413,996 B2
(45) Date of Patent: Aug. 16, 2022

(54) COMPOSITE STRUCTURE WITH A REINFORCED LINK

(71) Applicant: FAURECIA SYSTEMES D'ECHAPPEMENT, Nanterre (FR)

(72) Inventors: Nicolas Morille, Saint Jouan des Guérets (FR); Gwenaël Lelan, Saint Malo (FR); Grégory Herve, La Chapelle Chaussée (FR)

(73) Assignee: FAURECIA SYSTEMES D'ECHAPPEMENT

( * ) Notice: Subject to any disclaimer, the term of this patent is extended or adjusted under 35 U.S.C. 154(b) by 23 days.

(21) Appl. No.: 16/945,994

(22) Filed: Aug. 3, 2020

(65) Prior Publication Data
US 2021/0039533 A1    Feb. 11, 2021

(30) Foreign Application Priority Data
Aug. 5, 2019    (FR) .................... 19 08977

(51) Int. Cl.
*B60N 2/68*  (2006.01)
*B29C 45/14*  (2006.01)
*B29L 31/00*  (2006.01)

(52) U.S. Cl.
CPC ........ *B60N 2/686* (2013.01); *B29C 45/14786* (2013.01); *B29L 2031/771* (2013.01)

(58) Field of Classification Search
CPC .................................................. B60N 2/686
See application file for complete search history.

(56) References Cited

FOREIGN PATENT DOCUMENTS

| DE | 102006012699 A1 | * | 9/2007 | ............. B29C 70/16 |
| DE | 102009040902 A1 | * | 3/2011 | ............. B60N 3/10 |
| DE | 102015206962 A1 |   | 10/2016 | |
| DE | 102016011304 A1 | * | 3/2018 | ............. B60N 2/682 |
| DE | 102016217953 A1 | * | 3/2018 | ......... B60N 2/42709 |
| DE | 202020100065 U1 | * | 1/2020 | ............. B60N 2/686 |
| KR | 20130073961 A | * | 7/2013 | ............. B29C 45/14 |
| WO | 2011036185 A1 |   | 3/2011 | |
| WO | WO-2011036185 A1 | * | 3/2011 | ............. B60N 2/68 |
| WO | WO-2012032189 A1 | * | 3/2012 | ....... B29C 45/14786 |
| WO | 201312797 A2 |   | 9/2013 | |
| WO | WO-2013127972 A2 | * | 9/2013 | ............. B60N 2/686 |
| WO | WO-2016166349 A1 | * | 10/2016 | ............. B60N 2/682 |
| WO | WO-2017184091 A1 | * | 10/2017 | ............. B60N 2/686 |

OTHER PUBLICATIONS

French Search Report dated Jun. 8, 2020.

* cited by examiner

*Primary Examiner* — Timothy J Brindley
(74) *Attorney, Agent, or Firm* — Carlson, Gaskey & Olds, P.C.

(57) ABSTRACT

A composite structure comprising a substantially planar portion and a border arranged on the border of the substantially planar portion. A first linking zone is arranged at one end of the border along a first axis and a second linking zone is arranged at another end of the border along the first axis. The border further comprises a reinforcing zone connecting the first and second linking zones, in that the border has a profile transverse to the first axis that is substantially U-shaped opening on a side opposite the substantially planar portion and in that the border is reinforced by at least one rib substantially parallel to a second axis perpendicular to the first axis and included in the plane of the portion.

18 Claims, 4 Drawing Sheets

US 11,413,996 B2

COMPOSITE STRUCTURE WITH A REINFORCED LINK

CROSS-REFERENCE TO RELATED APPLICATIONS

This application is a U.S. non-provisional application claiming the benefit of French Application No. 19 08977, filed on Aug. 5, 2019, which is incorporated herein by reference in its entirety.

TECHNICAL FIELD

The disclosure relates to the field of composite structures, such as automobile seat carcasses, and more particularly relates to a link between two such structures, such as a link between a seat bottom structure and a backrest structure, and the reinforcement of this link to withstand a crash.

BACKGROUND

It is known to produce a composite structure, for example to form a carcass for an automobile seat backrest, comprising a substantially planar portion, forming the backrest, and a border, arranged on the border of the portion. The border comprises a first linking zone arranged at one end of the border along a first axis and is able to accommodate a first metal insert and a second linking zone arranged at the other end of the border along the first axis and able to accommodate a second metal insert, each of the two inserts being able to accommodate a hub, the two hubs being coaxial along the first axis so as to make it possible to form a link of the structure relative to another structure, such as a seat bottom, around the first axis.

The problem that such a composite structure encounters is its resistance to crash test(s). For an automobile seat, the first axis is arranged along an axis Y transverse to the vehicle, the seat bottom is substantially horizontal, in a plane XY, and the backrest is articulated between a usage position where it is substantially vertical, in a plane YZ, and a storage position where it is folded forward against the seat bottom, in a plane XY. The main anticipated direction of impact is along the axis X of the vehicle, from the rear. Such an impact is indicative of contents of the trunk compartment striking the back of the seat.

SUMMARY

In order to reinforce such a composite structure, the disclosure implements several complementary features.

The disclosure relates to a composite structure, such as a carcass for an automobile seat backrest, comprising a substantially planar portion and a border, arranged on the border of the substantially planar portion and comprising a first linking zone arranged at one end of the border along a first axis and able to accommodate a first metal insert and a second linking zone arranged at another end of the border along the first axis and able to accommodate a second metal insert symmetrical to the first metal insert, each of the first and second metal inserts being able to accommodate a hub, the hubs being coaxial along the first axis so as to make it possible to form a link of the composite structure relative to another structure, such as a seat bottom, around the first axis, where the border further comprises a reinforcing zone connecting the first and second linking zones, in that the border has a profile transverse to the first axis that is substantially U-shaped opening on a side opposite the substantially planar portion and in that the border is reinforced by at least one rib substantially parallel to a second axis perpendicular to the first axis and included in a plane of the substantially planar portion.

Specific features or embodiments, usable alone or in combination, are:

- at least one rib is further perpendicular to the first axis, and/or at least one rib is parallel to the first axis and/or at least one rib is oriented obliquely, preferably at −45° and at +45° relative to the first axis, with still more preferably at least two ribs crossed relative to one another, still more preferably perpendicularly,
- the composite structure further comprises at least one first organo (preimpregnated with continuous fibers and thermoplastic) arranged on an outer surface of the border substantially parallel to a plane including the first axis and the second axis, preferably longitudinally along the first axis, still more preferably over the entire length of the reinforcing zone and over at least a portion of the length of the first linking zone and the second linking zone and preferably over the surface opposite an anticipated direction of impact,
- the structure further comprises at least one second organo, arranged on an outer surface of the reinforcing zone of the border substantially parallel to a plane including the first axis and the second axis and over at least one portion adjacent to the substantially planar portion and preferably over the surface opposite an anticipated direction of impact,
- an organo is a composite part reinforced with continuous fibers, advantageously woven, prefabricated relative to the molding of the rest of the structure reinforced with cut fibers, where the fibers are preferably glass fibers.

In a second aspect of the disclosure, a seat comprising such a structure.

In a third aspect of the disclosure, a vehicle comprising such a seat.

BRIEF DESCRIPTION OF THE DRAWINGS

The disclosure will be better understood upon reading the following description, provided solely as an example, and in reference to the appended figures, in which.

DETAILED DESCRIPTION OF THE DRAWINGS

Figure 1:
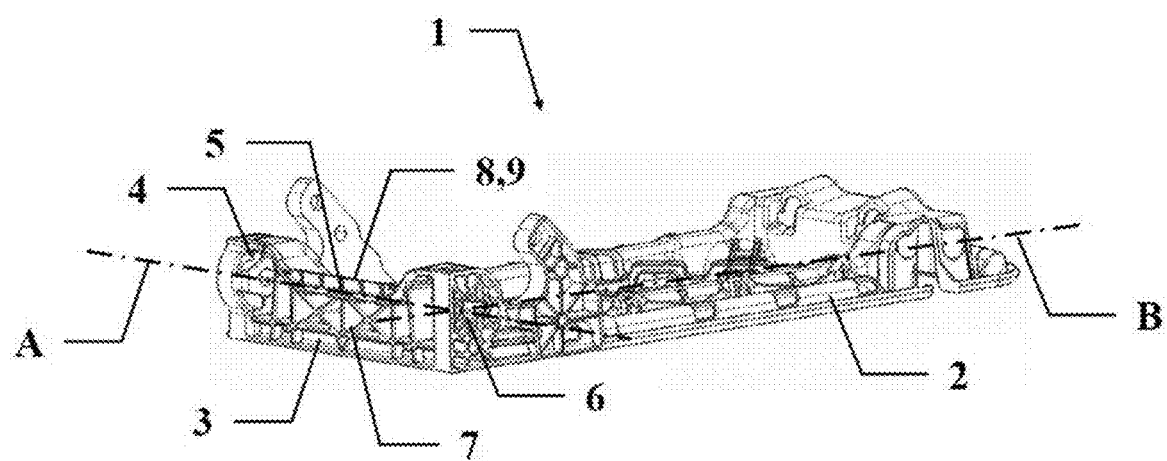
FIG. 1 shows, in perspective view, a composite structure according to the disclosure.
Figure 2:
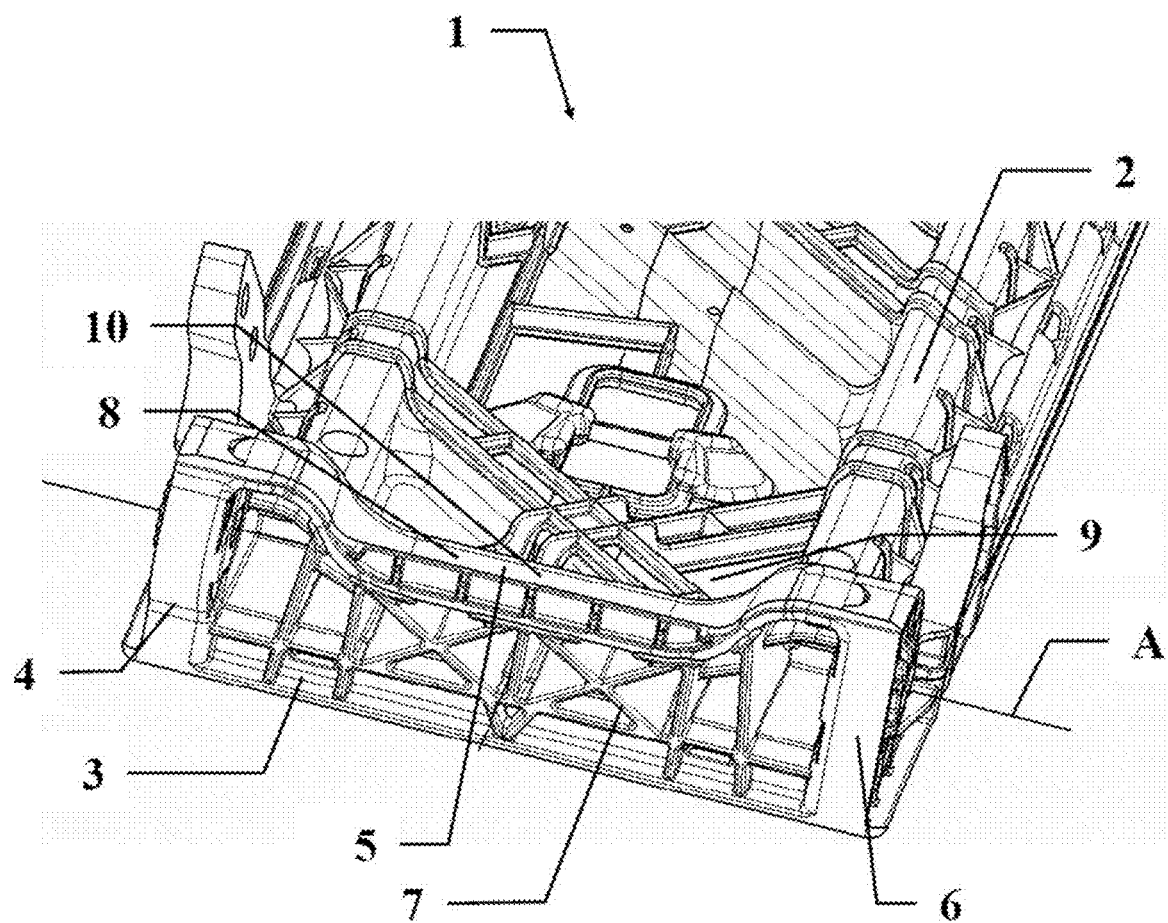
FIG. 2 shows, according to another perspective view, the structure of FIG. 1.
Figure 4:
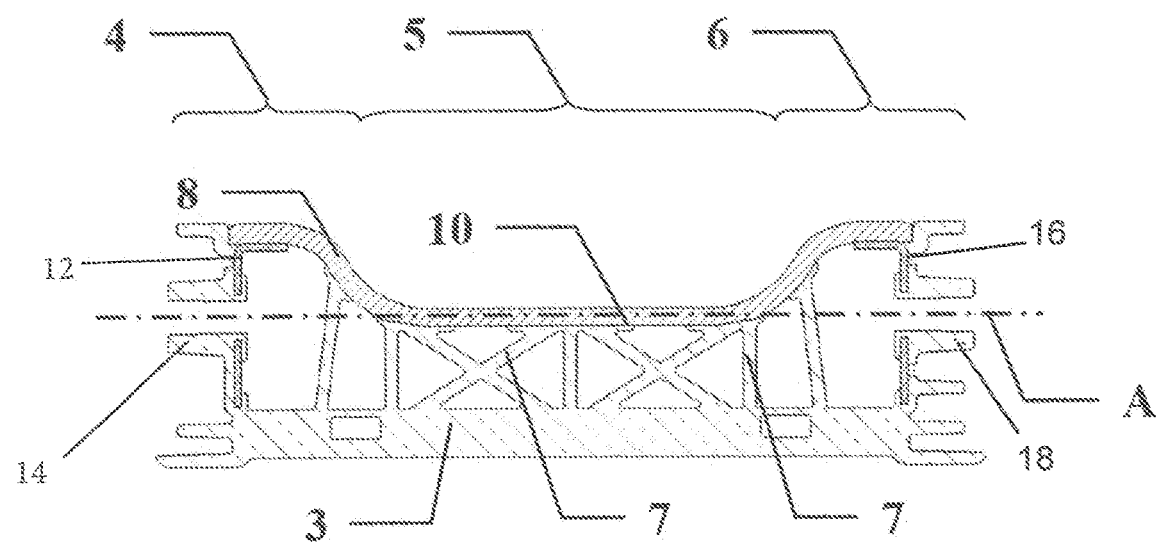
FIG. 4 shows, in sectional top view, the structure of FIG. 1.

In reference to FIG. 1, the composite structure 1, here a carcass for an automobile seat backrest, comprises a portion 2, covering the entire straight part, substantially planar, and a border 3, covering a portion that is as wide as it is high around the axis A. The border 3 is arranged on the border, or on one of the edges, for example here a small edge, of the portion 2. The border 3 can, along the axis A, be divided into a first linking zone 4, covering the portion of the border 3, arranged, along the axis A, at one end of the border 3, here the left end in the plane of the figure. This first linking zone 4 is configured to accommodate a first metal insert 12 able to bear a first hub 14 (FIG. 4) with an axis combined with the axis A. The border 3 can further be divided into a second linking zone 6, covering the portion of the border 3, arranged, along the axis A, at the other end of the border 3, here the right end in the plane of the figure. This second linking zone 6 is configured to accommodate a second metal insert 16, advantageously symmetrical to the first metal insert relative to a plane perpendicular to the axis A, able to bear a second hub 18 (FIG. 4) with an axis combined with the axis A and coaxial with the first hub. The two hubs coaxially aligned with one another and with the axis A thus make it possible to link the structure 1 relative to another structure (not shown), such as a seat bottom, around the axis A.

According to one feature, the border 3 further comprises a reinforcing zone 5, median portion, connecting the two linking zones 4, 6.

Figure 3:
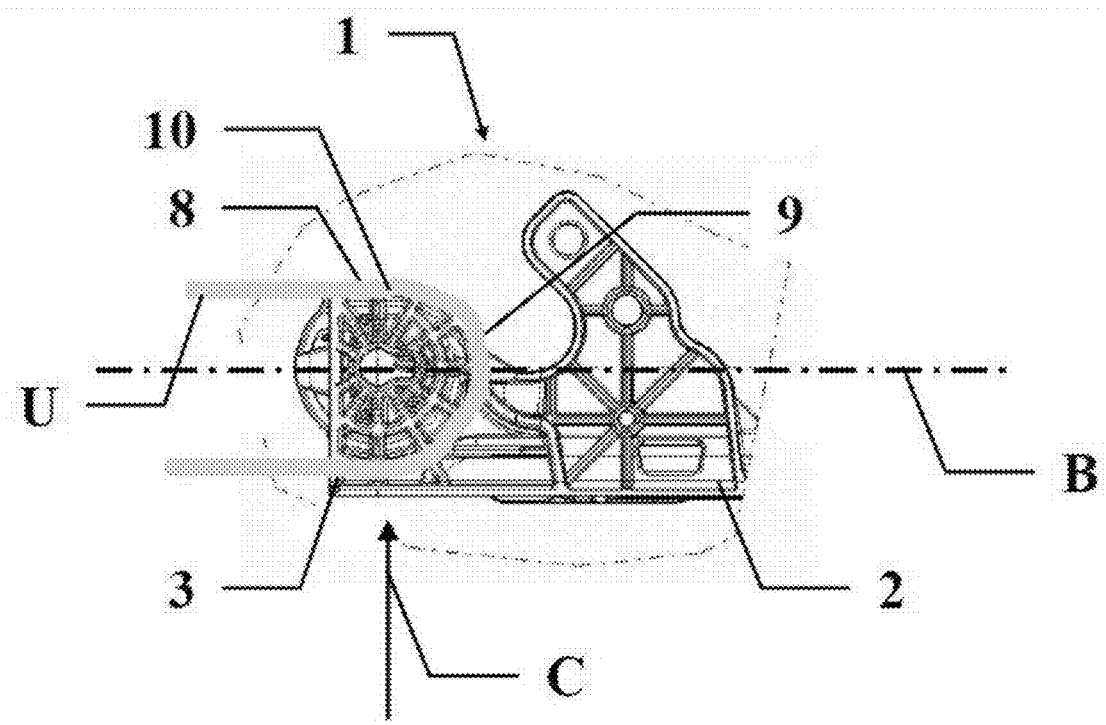
FIG. 3 shows, in partial cut profile view, the structure of FIG. 1.

According to another feature, more particularly visible in profile view, in FIG. 3, the border 3 has a profile transverse to the first axis A that is substantially U-shaped, highlighted in FIG. 3, opening on the side opposite the portion 2. Said U shape is applied both to the two linking zones 4, 6, and to the reinforcing zone 5, even if they have different widths. Therefore, the border 3 has a shell, with a substantially semi-cylindrical shape, substantially with axis A, opening on the side opposite the portion 2.

According to another feature, the border 3 is reinforced by at least one rib 7. This rib 7 occupies the inner volume of said shell of the border 3. All of said at least one rib 7 are substantially parallel to an axis B, which is perpendicular to the axis A and contained in the plane of the portion 2. This is advantageous in that said at least one rib 7 provides a reinforcement of the border 3.

Furthermore, this is advantageous in that this allows stripping of the border 3 along the direction B. The composite structure 1, as a whole, can thus advantageously be made by molding in a single part/operation.

The direction B imposes a first direction for the ribs 7. The second direction defining the orientation of a rib 7 can be any direction, and above all different from one rib 7 to another.

A rib 7 can also be parallel to the axis A.

According to another feature, a rib 7 can be secant to the axis A. Advantageously, if the secant angle is fairly pronounced, this feature makes it possible for the rib 7 to connect two opposite walls of the shell of the border 3, the two branches of the U thus providing a reinforcement of the border 3 along an anticipated direction C of impact, here chosen to be normal to the plane AB.

According to another feature, at least one rib 7 can be perpendicular to the axis A.

According to another feature, at least one rib 7 can be oriented obliquely, preferably at −45° and at +45° relative to the first axis A. In this case, at least two ribs are preferably crossed relative to one another, advantageously perpendicularly. Such crossing further reinforces the border 3 in that it adds a connection between two ribs 7.

According to another feature, the structure 1 further comprises at least one organo 8 arranged on an outer surface 10 of the border 3, substantially parallel to a plane containing the first axis A and the second axis B, or the plane of the portion 2. This organo 8 is preferably arranged longitudinally along the first axis A, over the length of the border 3. It further preferably extends over the entire length of the reinforcing zone 5 and at least part of the length of the first linking zone 4 and the second linking zone 6. The surface 10 is preferably the surface opposite an anticipated direction of impact C, as more specifically shown in FIG. 3. An impact along the direction C over a surface of the border 3 leads to tensile stresses on the opposite surface 10. Therefore, an organo 8, which primarily provides a tensile resistance, here is particularly suitable, on the surface 10 opposite the impact C.

According to another feature, the structure 1 further comprises at least one second organo 9. This second organo 9, like the first organo 8, is arranged on an outer surface 10 of the border 3, substantially parallel to a plane containing the first axis A and the second axis B. It covers the reinforcing zone 5 and extends over at least one portion adjacent to the portion 2. This results in increasing the securing of the border 3 with the portion 2. The border 3 that bears the hubs and the link transmits a significant share of the forces in case of impact. Like before, and for the same reasons, the surface 10 is preferably the surface opposite an anticipated direction of impact C.

In a known manner, an organo 8, 9 or insert made from continuous fiber reinforced thermoplastic (CFRT) is a composite part with thermoplastic matrix reinforced with continuous fibers, advantageously woven, so as to form one or several mats. This organo is prefabricated, or made before the molding of the structure 1. It can be preformed or made flat. It is next inserted, preferably hot in order to be malleable, in the production mold of the structure 1 so as to be able to conform to and marry the surface of the mold. The rest of the composite structure 1 is next made by injecting into the mold, against or around the organo(s) 8, 9, a "conventional" thermoplastic, in that it is reinforced with cut fibers.

According to another feature, the fibers, both those of the conventional thermoplastic and those of the organos 8, 9, are preferably glass fibers.

The thermoplastic, both the conventional one and that of the organos 8, 9, can be any thermoplastic such as PA6, PA66, PP, PET, PPS, PPA, . . . .

The disclosure further relates to an automobile seat comprising at least one such composite structure 1.

The disclosure further relates to a vehicle comprising at least one such seat.

The disclosure has been illustrated and described in detail in the drawings and the preceding description. The latter must be considered to be illustrative and provided as an example, and not as limiting the disclosure to this description alone. Many embodiment variants are possible.

LIST OF REFERENCE SIGNS

1: composite structure,
2: portion,
3: border,
4: first linking zone,
5: reinforcing zone,
6: second linking zone,
7: rib,
8, 9: organo,
10: outer surface

The invention claimed is:

1. A composite structure, such as a carcass for an automobile seat backrest, comprising:
   a substantially planar portion that is substantially parallel to a first axis and to a second axis that is perpendicular to the first axis;
   a border arranged on an edge of the substantially planar portion along the first axis and comprising a first linking zone arranged at one end of the border along the first axis and able to accommodate a first metal insert and a second linking zone arranged at another end of the border along the first axis and able to accommodate a second metal insert symmetrical to the first metal insert, each of the first and second metal inserts being able to bear a hub, the hubs being coaxial along the first axis to form a link of the composite structure relative to a second structure around the first axis, and wherein the border further comprises a reinforcing zone connecting the first and second linking zones;

wherein the border has a profile transverse to the first axis that is substantially U-shaped, the profile being open along the edge to face outward from the substantially planar portion in a direction which extends along the second axis;

wherein the border is reinforced by at least one rib extending in a plane substantially parallel to the second axis; and at least one first organo arranged on an outer surface of the border substantially parallel to a plane including the first axis and the second axis, the first organo being a thermoplastic insert reinforced with continuous fibers, and wherein the at least one first organo is a composite part reinforced with continuous fibers prefabricated relative to a molding of a remainder of the structure reinforced with cut fibers.

2. The structure according to claim 1, wherein the at least one rib is perpendicular to the first axis, the at least one rib is parallel to the first axis, the at least one rib is oriented obliquely relative to the first axis.

3. The structure according to claim 1, further comprising at least one second organo, arranged on an outer surface of the reinforcing zone of the border substantially parallel to a plane including the first axis and the second axis and over at least one portion adjacent to the substantially planar portion, the second organo being an insert made from thermoplastic reinforced with continuous fibers.

4. The structure according to claim 1, wherein the continuous fibers of the at least one first organo are woven.

5. The structure according to claim 4, wherein the continuous fibers of the at least one first organo are preferably glass fibers and/or the cut fibers are glass fibers.

6. A composite structure, such as a carcass for an automobile seat backrest, comprising:
a substantially planar portion that is substantially parallel to a first axis and to a second axis that is perpendicular to the first axis;
a border arranged on an edge of the substantially planar portion along the first axis and comprising a first linking zone arranged at one end of the border along the first axis and able to accommodate a first metal insert and a second linking zone arranged at another end of the border along the first axis and able to accommodate a second metal insert symmetrical to the first metal insert, each of the first and second metal inserts being able to bear a hub, the hubs being coaxial along the first axis to form a link of the composite structure relative to a second structure around the first axis, and wherein the border further comprises a reinforcing zone connecting the first and second linking zones;
wherein the border has a profile transverse to the first axis that is substantially U-shaped, the profile being open along the edge to face outward from the substantially planar portion in a direction which extends along the second axis;
wherein the border is reinforced by at least one rib extending in a plane substantially parallel to the second axis;
at least one first organo arranged on an outer surface of the border substantially parallel to a plane including the first axis and the second axis, the first organo being a thermoplastic insert reinforced with continuous fibers; and
at least one second organo, arranged on an outer surface of the reinforcing zone of the border substantially parallel to a plane including the first axis and the second axis and over at least one portion adjacent to the substantially planar portion, the second organo being an insert made from thermoplastic reinforced with continuous fibers, wherein the at least one second organo is a composite part reinforced with continuous fibers prefabricated relative to a molding of a remainder of the structure reinforced with cut fibers.

7. The structure according to claim 6, wherein the continuous fibers of the at least one second organo are woven.

8. The structure according to claim 7, wherein the continuous fibers of the at least one second organo are glass fibers and/or the cut fibers are glass fibers.

9. The structure according to claim 2, wherein the at least one rib is oriented obliquely relative to the first axis and is at −45° or at +45° relative to the first axis.

10. The structure according to claim 1, wherein the at least one rib comprises at least two ribs crossed relative to one another.

11. The structure according to claim 10, wherein the at least two ribs crossed relative to one another are crossed perpendicularly.

12. The structure according to claim 1, wherein the at least one first organo is arranged longitudinally along the first axis.

13. A composite structure, such as a carcass for an automobile seat backrest, comprising:
a substantially planar portion that is substantially parallel to a first axis and to a second axis that is perpendicular to the first axis;
a border arranged on an edge of the substantially planar portion along the first axis and comprising a first linking zone arranged at one end of the border along the first axis and able to accommodate a first metal insert and a second linking zone arranged at another end of the border along the first axis and able to accommodate a second metal insert symmetrical to the first metal insert, each of the first and second metal inserts being able to bear a hub, the hubs being coaxial along the first axis to form a link of the composite structure relative to a second structure around the first axis, and wherein the border further comprises a reinforcing zone connecting the first and second linking zones;
wherein the border has a profile transverse to the first axis that is substantially U-shaped, the profile being open along the edge to face outward from the substantially planar portion in a direction which extends along the second axis;
wherein the border is reinforced by at least one rib extending in a plane substantially parallel to the second axis; and
at least one first organo arranged on an outer surface of the border substantially parallel to a plane including the first axis and the second axis, the first organo being a thermoplastic insert reinforced with continuous fibers, wherein the at least one first organo is arranged over an entire length of the reinforcing zone and over at least a portion of a length of the first linking zone and the second linking zone.

14. The structure according to claim 1, wherein the at least one first organo is arranged over a surface opposite an anticipated direction of impact.

15. The structure according to claim 3, wherein the at least one second organo is arranged over a surface opposite an anticipated direction of impact.

16. The structure according to claim 1, wherein the composite structure comprises the automobile seat backrest that is configured to link with the second structure comprising a seat bottom.

17. A seat comprising a structure according to the claim 1.

18. A vehicle comprising at least one seat according to claim 17.

* * * * *